United States Patent [19]

Rollins et al.

[11] 4,433,745
[45] Feb. 28, 1984

[54] AIR CUSHION VEHICLE

[75] Inventors: Kay Rollins; Anthony N. Key, both of Ryde; Thomas F. Arlotte, Newport, all of England

[73] Assignee: British Hovercraft Corporation Ltd., Yeovil, England

[21] Appl. No.: 281,247

[22] Filed: Jul. 7, 1981

[30] Foreign Application Priority Data

Jul. 14, 1980 [GB] United Kingdom ............... 8022985

[51] Int. Cl.³ ............................................... B60V 1/11
[52] U.S. Cl. ............................ 180/118; 114/67 A; 180/127
[58] Field of Search .................... 180/116–130; 114/67 A; 301/124 R

[56] References Cited

U.S. PATENT DOCUMENTS 3,536,156 10/1970 Crago ............................ 180/127 X
3,907,061 9/1975 Chapman et al. .................. 180/117

FOREIGN PATENT DOCUMENTS 2080223 2/1982 United Kingdom ............... 180/117

Primary Examiner—David M. Mitchell
Assistant Examiner—Mitchell J. Hill
Attorney, Agent, or Firm—Larson and Taylor

[57] ABSTRACT

An apparatus is provided for effecting rapid changes in the geometry of a flexible wall structure forming at least a part of the cushion seal on an air cushion vehicle. The apparatus comprises one or more inflatable members co-operating with the flexible wall structure and an air ejector for rapidly introducing pressurized air into each inflatable member. Each inflatable member may be constituted by a wall structure portion of hollow construction. The invention finds particular application in assisting directional control of an air cushion vehicle.

3 Claims, 8 Drawing Figures

AIR CUSHION VEHICLE

This invention relates to air cushion vehicles (A.C.V.), and is particularly concerned with means for effecting changes in the geometry of a flexible wall structure forming at least a part of the vehicle cushion sealing means.

The cushion sealing means on an A.C.V. include flexible skirt structures, extending below the main hull of the vehicle, whose primary purpose is to contain the air cushion; flexible keel structures extending lengthwise of the vehicle below the underside of the main hull, for increasing the roll stability of the vehicle; and flexible compartmentation structures, extending laterally of the vehicle below the underside of the main hull, to divide the air cushion area into fore and aft compartments so as to increase the pitch stability of the vehicle.

In order to effect directional and/or trim control of an A.C.V., it may be necessary to move one or more of the flexible wall structures forming the vehicle cushion sealing means either towards and away from or laterally relative to the surface over which the vehicle travels. Thus, for example, a fully flexible skirted A.C.V. tends to roll outwardly under the action of centrifugal force when turning about a remote point. Amongst the various means that may be used to counteract this tendency and to assist in directional control of the A.C.V. are lift vectoring devices. These devices can be divided into two categories: those which physically move the cushion and hence the centre of pressure; and those which modify the cushion pressure distribution thus changing the centre of pressure position and hence lift moment about the centre of gravity. Both of these types may be used to provide rolling and/or pitching moments and hence side and thrust forces, and should surface contact occur at forward speed, some yawing moment. By effecting inward movement of the skirt hemline along that side of the A.C.V. which is on the inside of a turn, the position of the centre of pressure of the cushion can be shifted with respect to the centre of gravity to produce a lift moment that counteracts the tendency of the vehicle to roll outwardly. Alternatively, or additionally, the hemline of the skirt may be lifted along that side of the A.C.V. which is on the inside of the turn, so as to allow cushion air to escape, thereby modifying the pressure distribution so that the position of the centre of pressure is shifted.

Heretofore, movement of the flexible skirt for such purposes has generally been effected by mechanical means such as cables and pulleys, or levers and rod arms, operated by hydraulic jacks. One example of such a system is to be found in U.S. Pat. No. 3,288,235. Such systems introduce considerable complexity at the underside of the vehicle, which is exposed to a very corrosive environment when the vehicle is operating over a sea surface. This has given rise to problems such as failure of the hydraulic jacks, due to sticking or leakage of hydraulic fluid. Another disadvantage with such systems is that unless a longitudinally extending rigid rod is interposed in the system between the hydraulic jacks and the connection to the flexible skirt, the hydraulic jacks will not give equal movement of the hemline of the skirt over that length of the skirt on which they are acting.

It has also been proposed in U.S. Pat. No. 3,907,061 to utilise the inflation of inflatable means to effect distortion of an A.C.V. flexible skirt for the purpose of effecting trimming of the vehicle to suit prevailing operating conditions of e.g. sea state and load distribution. However, the means proposed for accomplishing the inflation of the inflatable means, while appropriate for relatively slow adjustment of the vehicle trim, e.g. at the commencement of a voyage, would be incapable of making the rapid changes in configuration of the inflatable means, and thus of the skirt adjacent thereto, necessary to produce shifts of the effective centre of pressure at a rate to be useful in assisting directional control of the vehicle. Moreover, the inflatable means proposed are incorporated in the skirt structure itself and thus must be adopted in the original design of a vehicle and are unsuited to fitment to an existing vehicle without substantial and costly modification and/or replacement of the skirt thereof.

It is an object of the present invention to provide means for effecting a controlled change in the geometry of a flexible wall structure forming at least a part of the cushion sealing means for an A.C.V.

It is another object of the present invention to provide means for effecting equal and rapid changes in the geometry of an A.C.V. flexible wall structure over that length of the wall structure with which the means are associated.

It is a further object of the present invention to provide means for effecting controlled changes in the geometry of an A.C.V. flexible skirt structure that considerably reduces the mechanical complexity of the prior art skirt shift systems, while being appropriate to accomplish hemline movement at a rate adequate for assisting directional control of the vehicle.

In its broadest aspect the present invention provides an air cushion vehicle including cushion sealing means comprised at least in part by a flexible wall structure, means for effecting a change in the geometry of the flexible wall structure comprising at least one inflatable member co-operating with the flexible wall structure and means for rapidly introducing pressurised air into the inflatable member to cause a geometry change from an uninflated shape to an inflated shape and thereby to simultaneously effect a change in the geometry of the flexible wall structure.

Preferably, the means for rapidly introducing pressurised air into the or each inflatable member comprises air ejector means.

The air ejector means may comprise an air ejector located within a plenum chamber defined by rigid body structure of the A.C.V., and to which pressurised air is supplied by one or more vehicle lift fans. The air ejector may conveniently be operated by high pressure air bled from the compressor stage of a gas turbine engine located on the A.C.V. Because it is capable of causing rapid build-up and decay of large volume flows of air, an air ejector powered by high pressure air can produce, in simple and easily controlled manner, the rapid inflation of the inflatable member necessary to effect controlled changes in the geometry of a flexible skirt wall structure for effective assistance of directional control of the vehicle in fast manoeuvring thereof.

The inflatable member may be constituted by a wall structure portion of hollow construction.

Thus in an embodiment of the invention the inflatable member is constituted by a hollow wall structure portion formed by sealingly attaching an elongate strip of reinforced elastomeric sheet at its marginal edge portions to reinforced elastomeric sheet of the wall structure so that the elongate strip extends along at least a part of the length of the wall structure, and encloses a space with that portion of the elastomeric sheet material of the wall structure to which the elongate strip lies adjacent when the space is not inflated. In the uninflated condition a maximum straight line dimension exists between the opposed lengthwise extending edges of the elongated strip, and the introduction of pressurised air into the space foreshortens this dimension because the elongate strip and the material of the wall structure are inflated outwardly away from each other, thereby bringing the marginal lengthwise edges of the elongate strip, and those portions of the material of the wall structure to which they are sealingly attached, closer to each other. This change in the geometry of the inflatable member from an uninflated shape to an inflated shape simultaneously effects a change in the geometry of the flexible wall structure, the geometry change being controlled by the pressure to which the space is inflated and also being dependent upon the straight line dimension between the opposed marginal lengthwise extending edges of the elongate strip, i.e. the width of the elongate strip.

The present invention is particularly suited for use with flexible skirt structures of the two-stage configuration, such as the well known bag and fingers skirt assembly, and the loop and fingers skirt assembly.

In the bag and fingers skirt configuration the upper stage of the skirt is provided by an inflatable bag member formed by bolting together sheets of reinforced elastomeric material and connecting this assembly of sheets along opposed edges to spaced lines of attachment on the vehicle rigid structure. In embodying the present invention into this skirt configuration a portion of the bag member which is disposed inboard with respect to the rigid body structure of the A.C.V. may be formed as a hollow construction enclosing a space which extends along the length of the bag member substantially parallel with the inboard line of attachment of the bag member on the rigid body structure. Inflation of the space will change the geometry of the bag member and effect inboard movement of the lower tips of the skirt fingers, i.e. the skirt hemline, thereby shifting the centre of pressure of the cushion if the skirt hemline is moved inboard along one side only of the A.C.V.

In another aspect the present invention provides an A.C.V. having cushion sealing means comprised at least in part by a flexible wall structure, means for effecting a change in the geometry of the flexible wall structure and comprising a wall structure portion between opposed marginal edge portions thereof of a hollow construction enclosing a space, and air ejector means powered by high pressure air for rapidly introducing pressurised air into said space so as to effect changes in the shape of the hollow portion of the wall structure between an uninflated condition and a fully inflated condition, and thereby to simultaneously effect a change in the geometry of the wall structure.

The present invention may be used to effect movement, in particular lifting, of a flexible skirt wall structure across the rear of an A.C.V., so as to provide cushion attenuation to counteract a tendency of the vehicle to pitch bow down. Use of the invention for this purpose may also extend to rigid sidewall A.C.V.'s.

The present invention may also be embodied in flexible keel structures and flexible lateral compartmentation structures which are used to divide the air cushion space at the underside of an A.C.V., so as to increase the roll and pitch stiffness, respectively. Using the present invention, controlled movement of the keel and/or lateral compartmentation structures may be effected towards and away from a surface over which the A.C.V. is operating, e.g. when it is required to reduce the effectiveness of one or more of these barriers so as to bring about changes in the trim of the vehicle or when, in certain operating conditions, it may be desirable to move one or more of these barriers away from the surface over which the vehicle is operating in order to reduce drag.

The invention will now be described by way of example and with reference to the accompanying drawings, in which.

Figure 1:
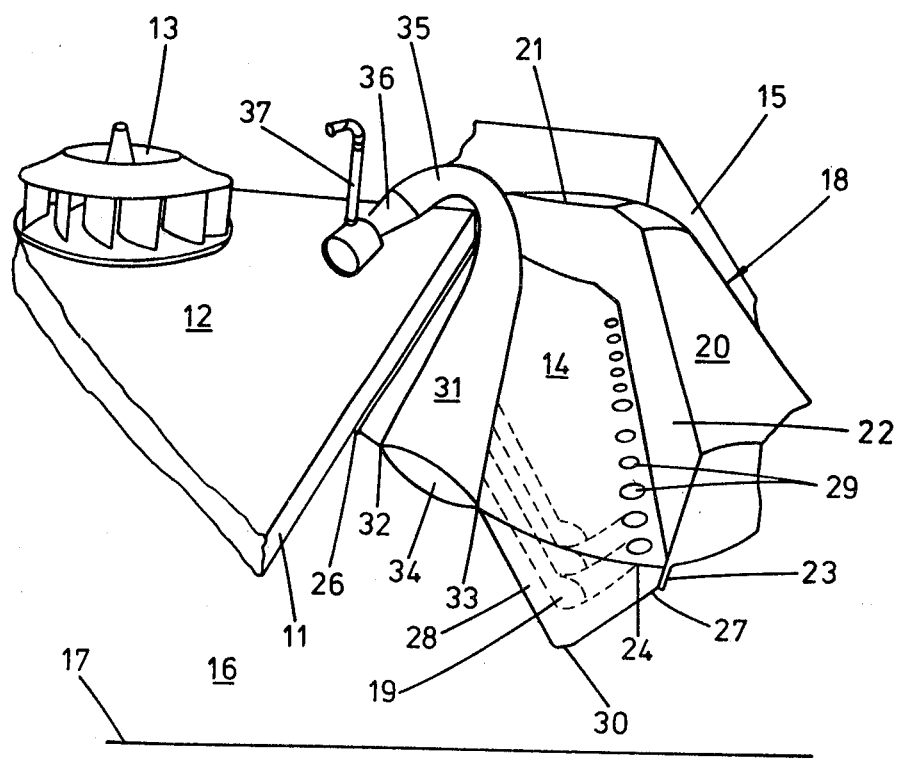
FIG. 1 is a pictorial view of part of an A.C.V. having a bag and fingers skirt wall structure embodying means for effecting a change in the skirt wall structure geometry in accordance with the present invention.

Referring to FIG. 1, the rigid body structure of an A.C.V. (not shown in full) generally includes a buoyancy tank 11 that, together with other structures (not shown) defines a plenum chamber 12 into which pressurised air is delivered by a lift fan 13. A gas turbine engine (not shown) drives the lift fan 13 through a transmission system (not shown). In operation, pressurised air from the plenum chamber 12 flows by way of a duct 14 formed between the sides of the buoyancy tank 11 and rigid side structure 15 to the underside of the vehicle to build up and sustain a cushion of pressurised air 16 between the underside of the buoyancy tank 11 and a surface 17 over which the vehicle operates.

Sealing means for preventing lateral escape of the air cushion 16 includes a flexible skirt wall structure which in the embodiment of FIG. 1 comprises an inflatable bag member 18 to the underside of which is attached a plurality of fingers 19. In transverse cross-section the bag member 18 comprises an outer sheet 20 of reinforced elastomeric material, for example, neoprene sheet reinforced with woven nylon fabric, connected at one edge by hinged attachment means (not shown) along an attachment line 21 (the outer attachment line of the bag member) to the rigid structure 15. The opposite edge of the sheet 20 is connected with the lower edge of a bag member stiffening web 22 also formed from reinforced elastomeric material, and having its upper edge attached to the rigid structure 15 at or near the outer attachment line 21. The lower portion of the sheet 20 and the web 22 form an apron 23. A sheet of reinforced elastomeric material 24 connected at one edge to the web 22, extends inwardly to have its opposite edge connected by hinge fastening means (not shown) to the buoyancy tank 11 along an attachment line 26. The reinforced elastomeric sheet 24 is provided with holes 29 so that pressurised air may flow from the plenum chamber 12 to the cushion 16.

Each finger 19 is of substantially triangular shape in developed profile, and is formed from reinforced elastomeric material. The finger is folded to provide an arcuate portion 27 and two web portions 28 extending one from either side of the arcuate portion as a continuation thereof. The upper part of the arcuate portion 27 is attached to the apron 23 of the bag member 18 by bolting and the upper edges of the web 28 are attached by bolting to attachment webs (not shown) on the sheet 24 of the bag member 18. The arcuate portions 27 and webs 28 of the fingers 19 extend downwardly to terminate near to the surface 17 at tip portions which together define a skirt hemline 30.

An elongate strip 31 of reinforced elastomeric sheet material is sealingly attached at its marginal edge portions 32 and 33 to the reinforced elastomeric sheet 24 of the bag member 18. The elongate strip 31 extends along the length of the reinforced elastomeric sheet 24 so as to be substantially parallel with the line of attachment 26 and to enclose a space 34. One end of the elongate strip 31 is continued by a tubular duct 35 which joins with an air ejector 36, and the other end (not shown) of the elongate strip 31 is sealed to the sheet 24. A conduit 37 connects between the air ejector 36 and a tapping from the compressor stage of the gas turbine engine (not shown) which is used to power the lift fan 13. Flow control orifices 38 (reference FIGS. 2 and 3) are provided in the sheet 24 between the attachments of the edges 32 and 33 of the elongate strip 31.

Figure 2:
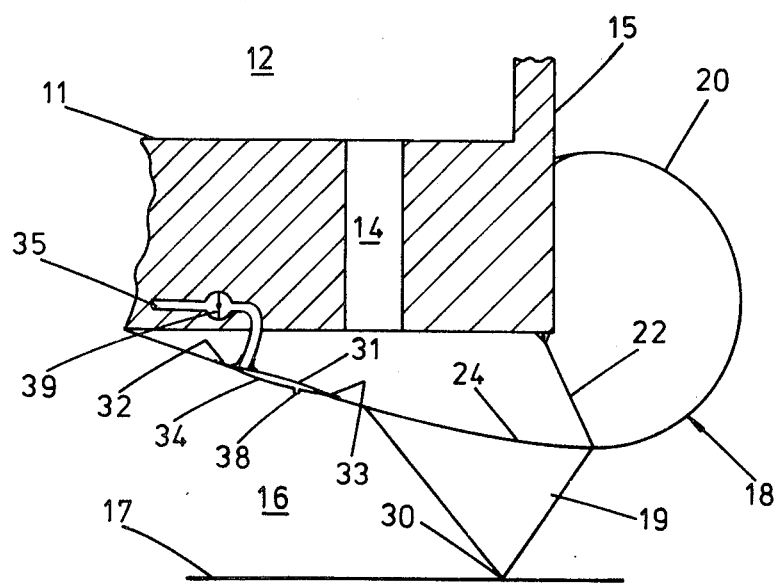
FIG. 2 is a transverse cross-section through a bag and fingers skirt wall structure similar to that shown in FIG. 1 and embodying inflatable means for effecting a change in skirt wall structure geometry, with such means uninflated.
Figure 3:
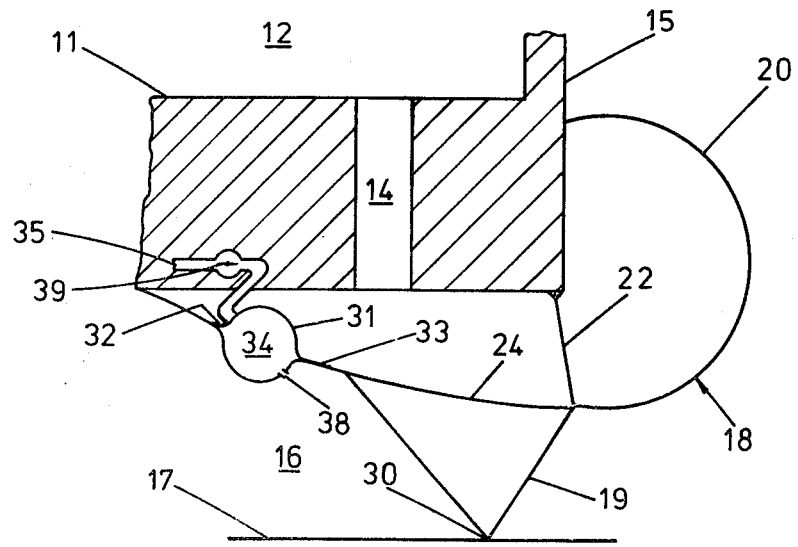
FIG. 3 is a transverse cross-section through the bag and fingers skirt wall structure shown in FIG. 2, showing the inflatable means inflated.

Operation of the invention will be better understood by reference to FIGS. 2 and 3 of the accompanying drawings which show transverse cross-sections through flexible skirt wall structures of similar construction to that shown in FIG. 1 so that like components are given line reference numerals.

The bag member 18 is inflated by pressurised air flowing from the lift fan through the duct 14 into the compartment bounded by the sheet 24, the stiffening web 22 and the buoyancy tank 11. Air flows from this compartment through non-return flap valves (not shown) in the stiffening web 22 or ducts (not shown) in the rigid structure 15 to inflate the compartment bounded by the sheet 20, the stiffening web 22 and the rigid structure 15. As shown in FIG. 2 the space 34 between the elongate strip 31 and the sheet 24 is uninflated so that the elongate strip 31 lies substantially flat against the sheet 24, and the sheet 24 extends in a continuous curve between its attachments to the buoyancy tank 11 and the stiffening web 22, the shape of this curve being dependent on the pressure difference between the bag member inflation pressure and the cushion pressure. Thus in a static condition the skirt hemline 30, defined by the tip portions of the fingers 19, will take up a position as shown in FIG. 2, which position is dependent upon the geometries of the bag member 18 and fingers 19.

In FIG. 3 a valve member 39 in the duct 35 is shown in an open position so that pressurised air passes through the duct 35 from an air ejector (not shown in FIGS. 2 and 3) to the space 34 to inflate the elongate strip 31 and that portion of the sheet 24 between the edges 32 and 33 of the elongate strip 31, outwardly away from each other. Thus the edge 33 of the elongate strip 31 and that portion of the sheet 24 to which it is sealingly attached are moved towards the edge 32 of the elongate strip 31 and that portion of the sheet 24 to which it is attached, thereby bringing about a change in the geometry of the bag member 18 which moves the skirt hemline 30 inwardly with respect to the cushion 16. The amount of movement imparted to the skirt hemline 30 will be dependent upon the width dimension of the elongate strip 31, i.e. the dimension between the edges 32 and 33, and the inflation pressure in the space 34. Because the action of the means for effecting a change in the geometry of the flexible skirt wall structure, in accordance with the present invention, is similar to the action of a muscle in the human body, we refer to this means as a skirt 'muscle'.

An A.C.V. having its propulsive thrust produced by a single aft-mounted fixed air propeller, such as the A.C.V. designated SR.N6 that is produced by the British Hovercraft Corporation Limited, has to sideslip when executing a turn about a remote point so as to generate the necessary side forces. As well as having a tendency to roll out when executing such a turn, the vehicle also tends to pitch bowdown because sideslip forces acting on the fingers at the bow due to surface contact cause the fingers to crumple and become immersed when the vehicle is operating over water, thereby giving rise to increased drag forces at the bow.

When executing a similar turn an A.C.V. having its propulsive thrust produced by fore and aft swivelling pylon-mounted propellers, such as the vehicle designated SR.N4 which is produced by the British Hovercraft Corporation Limited and is currently in commercial operation on English Channel ferry routes, can generate the necessary side forces by vectoring the propellers so that it does not have to sideslip. Whilst the vehicle has a tendency to roll out of the turn, the tendency to pitch bowdown is avoided.

Figure 4:
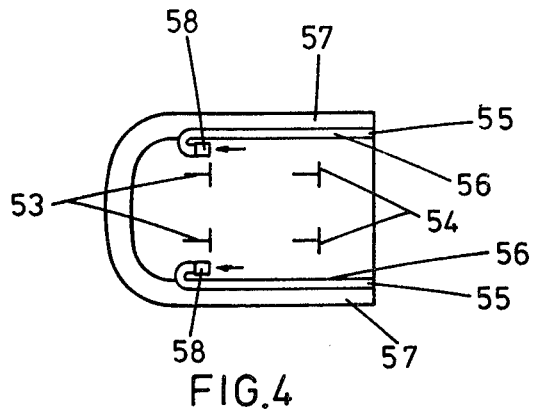
FIG. 4 is a diagrammatic view in plan of an A.C.V. having forward and aft thrust propellers and embodying the present invention in the flexible skirt wall structures forming the cushion sealing means along the longitudinal sides of the vehicle.

In an A.C.V. of the SR.N4 type, as shown in FIG. 4, having fore and aft swivelling pylon-mounted propellers 53 and 54, respectively, means for effecting a change in a flexible skirt wall structure in accordance with the present invention, hereinafter referred to as a skirt 'muscle' 55, may be embodied in the skirt bag member 57 near to the inner fixing line 56 and along the complete length of each longitudinal side of the vehicle. As previously described with respect to FIGS. 2 and 3, the skirt 'muscle' 55 along that side of the vehicle which is on the inside of the turn may be inflated with pressurised air supplied by an air ejector 58 to effect movement of the skirt hemline and hence to shift the centre of pressure of the cushion so as to produce a rolling moment about the centre of gravity of the vehicle that counteracts the tendency to roll out of the turn.

Figure 5:
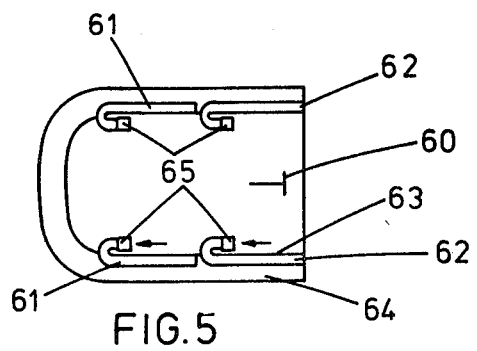
FIG. 5 is a view similar to FIG. 4 showing an A.C.V. having a single aft mounted thrust propeller and illustrates a modification of the invention embodied in the flexible skirt assemblies extending along the longitudinal sides of the vehicle.

In an A.C.V. of the SR.N6 type, as shown in FIG. 5, having a single aft-mounted fixed propeller 60, two skirt 'muscles' 61 and 62 are provided in the bag member 64 at each of the longitudinal sides of the vehicle. The skirt 'muscle' 61 extends parallel to the inner hingeline 63 of the skirt bag member 64 at the forward portion of the longitudinal side of the vehicle and the skirt 'muscle' 62 extends parallel to the inner hingeline of the skirt bag member at the aft portion of the longitudinal side of the vehicle. The skirt 'muscles' 61 and 62 are arranged for inflation by separate air ejectors 65. When the vehicle is executing a turn both of the skirt 'muscles' 61 and 62 at that side of the vehicle which is on the inside of the turn are inflated to effect movement of the skirt hemline and hence to shift the centre of pressure of the cushion with respect to the c.g. so as to produce a rolling moment that counteracts the tendency of the vehicle to roll out of the turn. At the same time the skirt 'muscle' 62 is arranged to lift the skirt hemline so as to attenuate the cushion pressure at the aft end of the vehicle on the inside of the turn and so cause the vehicle to trim bow-up, thereby counteracting the tendency to pitch bow-down, as previously described. In some vehicles of this type it may be found possible to dispense with the skirt 'muscles' 61 because sufficient movement of the centre of pressure of the cushion can be obtained using the skirt 'muscles' 62 along the aft portion of each longitudinal side.

Figure 6:
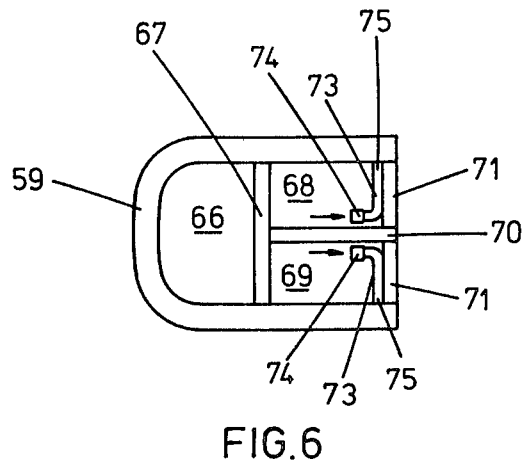
FIG. 6 is a view similar to FIG. 4 but illustrating embodiment of the present invention in flexible skirt assemblies forming the cushion sealing means across the rear of an A.C.V.

FIG. 6 shows the cushion compartmentation on a large A.C.V. of the SR.N4 type. The cushion sealing means along the longitudinal sides and around the bow of the vehicle comprise a bag and finger skirt configuration 59, and the main cushion area is compartmented into a forward cushion compartment 66 by a transverse stability barrier 67, and into two laterally disposed aft cushion compartments 68 and 69 by a longitudinal keel member 70 extending from the transverse stability barrier 67 to the aft end of the vehicle. The cushion sealing means at the aft end of the vehicle comprises bag members 71, disposed one at either side of the keel 70, and to the underside of which may be attached dependent flexible members known in the art as cones. Skirt 'muscles' 73 in accordance with the present invention, and arranged for inflation by air injectors 74, are provided on the bag members 71. The skirt 'muscles' 73 may be used to lift the bags 71 so as to attenuate the cushion pressure in the compartments 68 and 69, thereby bringing about changes in the trim of the vehicle.

Figure 7:
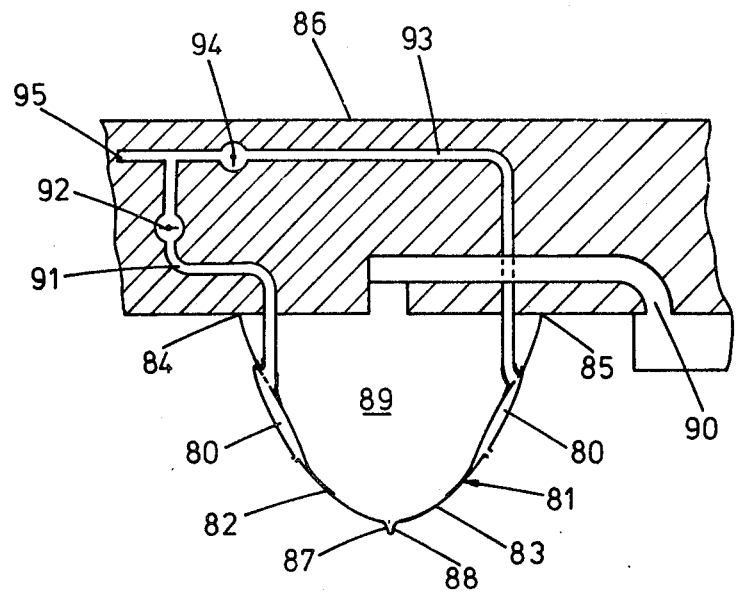
FIG. 7 is a transverse cross-section through a flexible keel structure embodying inflatable means for effecting changes in keel structure geometry, with such means uninflated.
Figure 8:
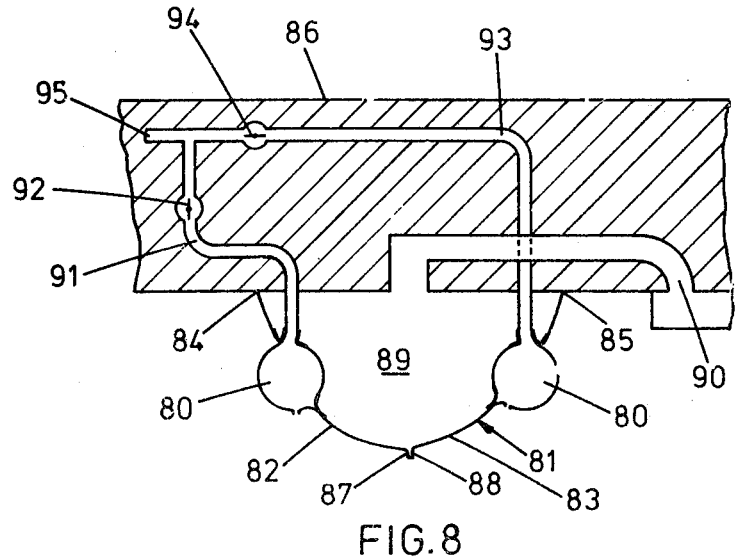
FIG. 8 is a transverse cross-section through the flexible keel structure shown in FIG. 4, showing the inflatable means inflated.

As shown in FIGS. 7 and 8 of the accompanying drawings, skirt 'muscles' 80 may be incorporated in a flexible keel structure 81 so as to effect a change in the geometry of the keel structure 81. The keel structure 81 comprises two walls 82 and 83 formed by reinforced elastomeric sheet material, each wall 82 and 83 having an upper edge 84 and 85, respectively, connected along spaced lines of attachment to the underside of the buoyancy tank 86 of an A.C.V. (not shown), and being sealingly joined to each other near to their lower edges 87 and 88, respectively, to enclose with the buoyancy tank 86 a space 89. Pressurised air from the vehicle plenum chamber (not shown), or from some other suitable source, is supplied to the space 89 by way of a duct 90 to inflate the keel structure 81 as is shown in FIG. 1.

Skirt 'muscles' 80 in accordance with the present invention are provided in each of the walls 82 and 83, the skirt 'muscles' 80 being formed in a similar manner to that described from the embodiments of FIGS. 1, 2 and 3. The skirt 'muscle' 80 in the wall 82 connects with an air supply duct 91 which is arranged to be closed, as shown in FIG. 7, by a valve member 92. Similarly, the skirt 'muscle' 80 in the wall 83 connects with an air supply duct 93 which is arranged to be closed by a valve member 94. The ducts 91 and 93 connect with an air supply duct 95 leading from a source of pressurised air, e.g. an air ejector arrangement in the vehicle plenum chamber (not shown).

As shown in FIG. 8 both of the valves 92 and 94 can be opened to provide inflation of both of the skirt 'muscles' 80, thereby changing the geometry of the keel structure 81 so as to cause the lower portion of the keel structure 81 to move upwardly towards the underside of the buoyancy tank 86, and away from a surface over which the A.C.V. is operating, thus reducing the effectiveness of the keel structure 81.

Inflation of one of the skirt 'muscles' 80 will change the geometry of the keel structure 81 such that the lower portion thereof is moved upwardly and to one side.

It is to be appreciated that a flexible wall structure similar to the keel structure 81 shown in FIGS. 7 and 8, and incorporating skirt 'muscles' 80, may be used to form a lateral compartmentation barrier in the cushion area beneath the buoyancy tank or main hull of an A.C.V. Such a lateral compartmentation barrier may have attached to its lower portion dependent side-by-side skirt wall members, e.g. inflatable tubular members known in the art as cones. Once again, the skirt muscles may be used to effect changes in the geometry of the barrier, thereby reducing its effectiveness so as to allow cushion air to flow from one compartment to another for control purposes, or to move the barrier away from the surface over which the vehicle is operating so as to bring about a reduction in surface drag.

What is claimed is:

1. An air cushion vehicle including a rigid body structure, a plenum chamber in said rigid body structure, at least one lift fan for supplying pressurized air to said plenum chamber, cushion sealing means including a flexible skirt structure extending below the rigid body structure to contain the air cushion, an elongate strip secured to the flexible skirt structure to form at least one inflatable member on said flexible skirt structure, a duct extending from said inflatable member to said plenum chamber, means for providing a source of high pressure air, air ejector means in said duct, said air ejector means including a conduit providing a passageway from said source of high pressure air to said duct whereby the geometry of said inflatable member may be rapidly changed from an uninflated shape to an inflated shape to simultaneously effect a change in the geometry of the flexible wall structure to provide directional control of the air cushion vehicle.

2. An air cushion vehicle according to claim 1 wherein said means for providing a source of high pressure air comprises a compressor stage of a gas turbine engine.

3. An air cushion vehicle according to claim 1 wherein said elongate strip is secured to the flexible skirt structure along marginal edge portions of the elongate strip so as to extend along at least a part of the length of the flexible wall structure.

* * * * *